July 8, 1941.  M. A. HOLLENGREEN ET AL  2,248,172
RACE GRINDER
Filed June 17, 1938  9 Sheets-Sheet 5
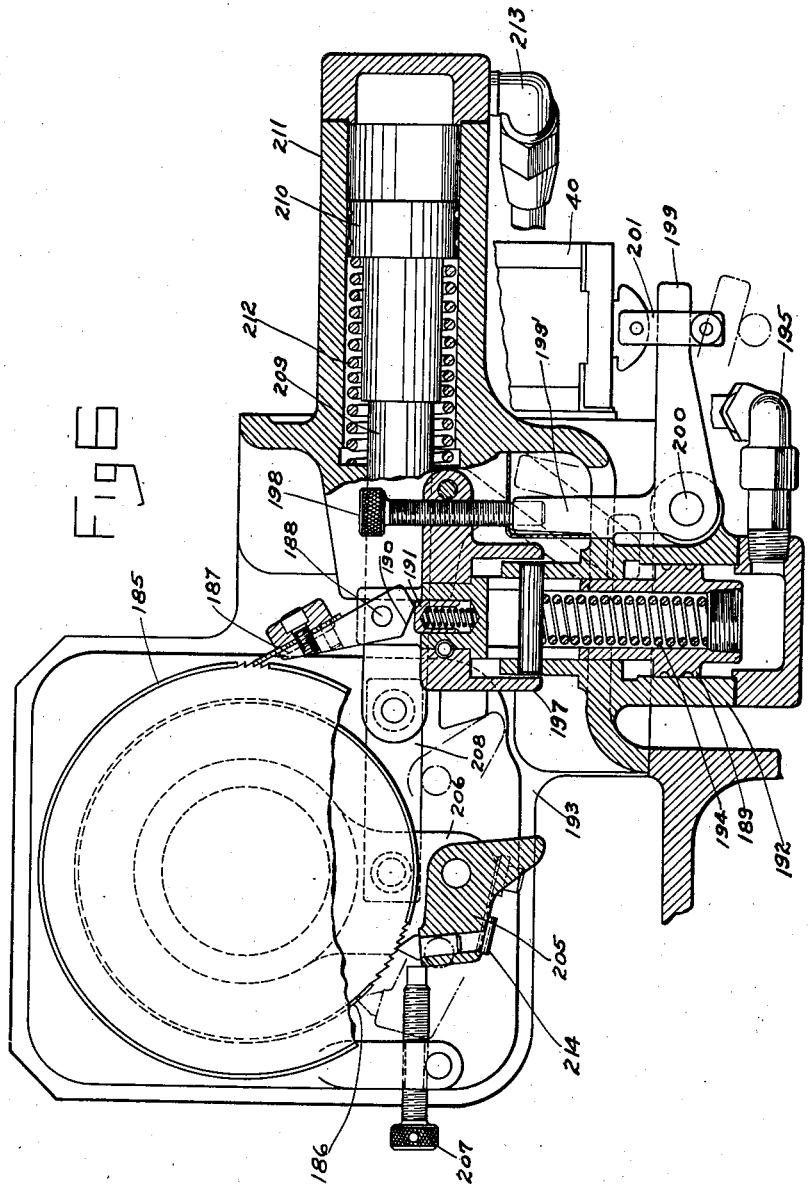
Inventors
MILBURN A. HOLLENGREEN
DANIEL GURNEY
By JOHN A. BOLLER
ROBERT S. ELBERTY JR.
Attorney

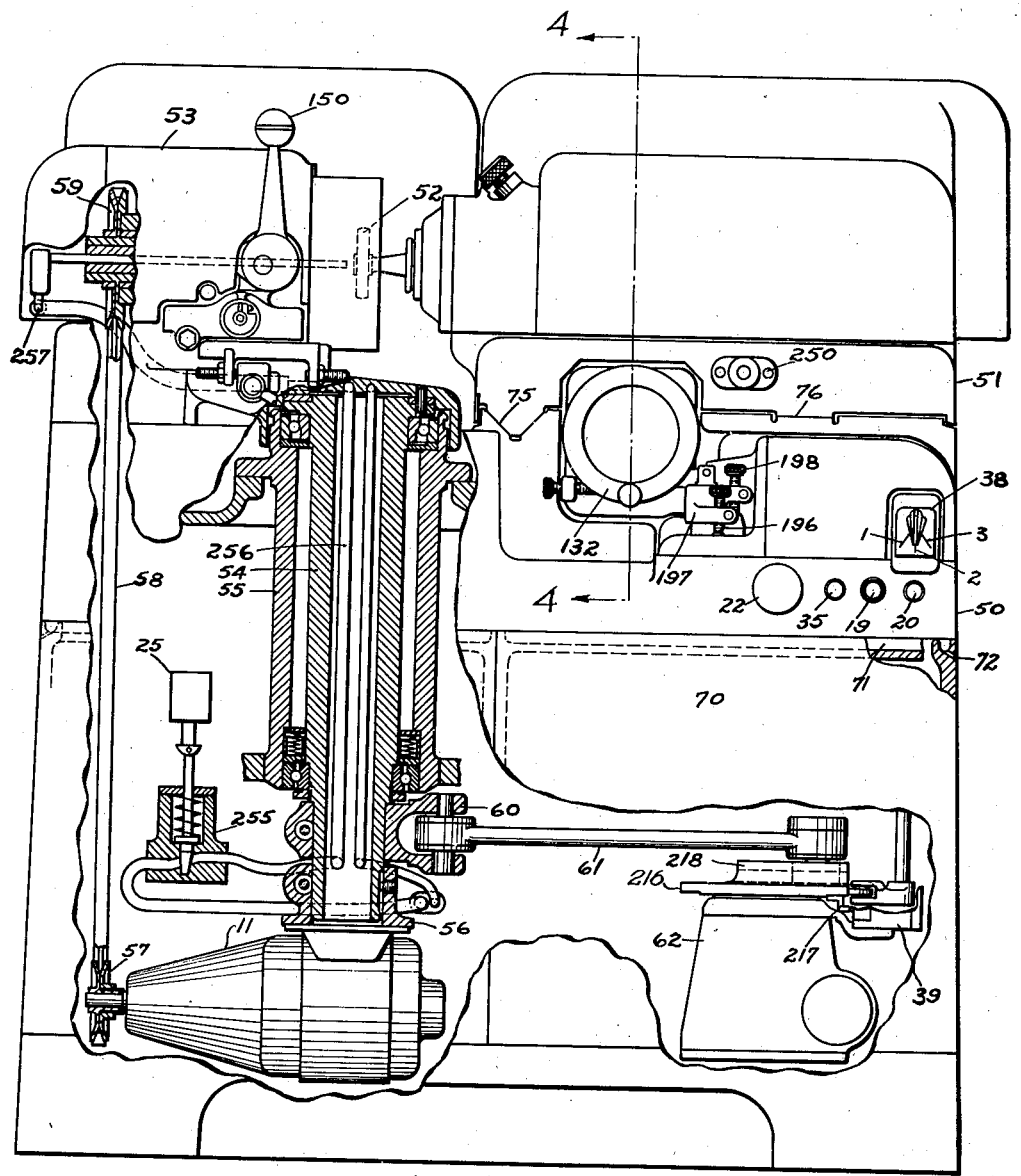

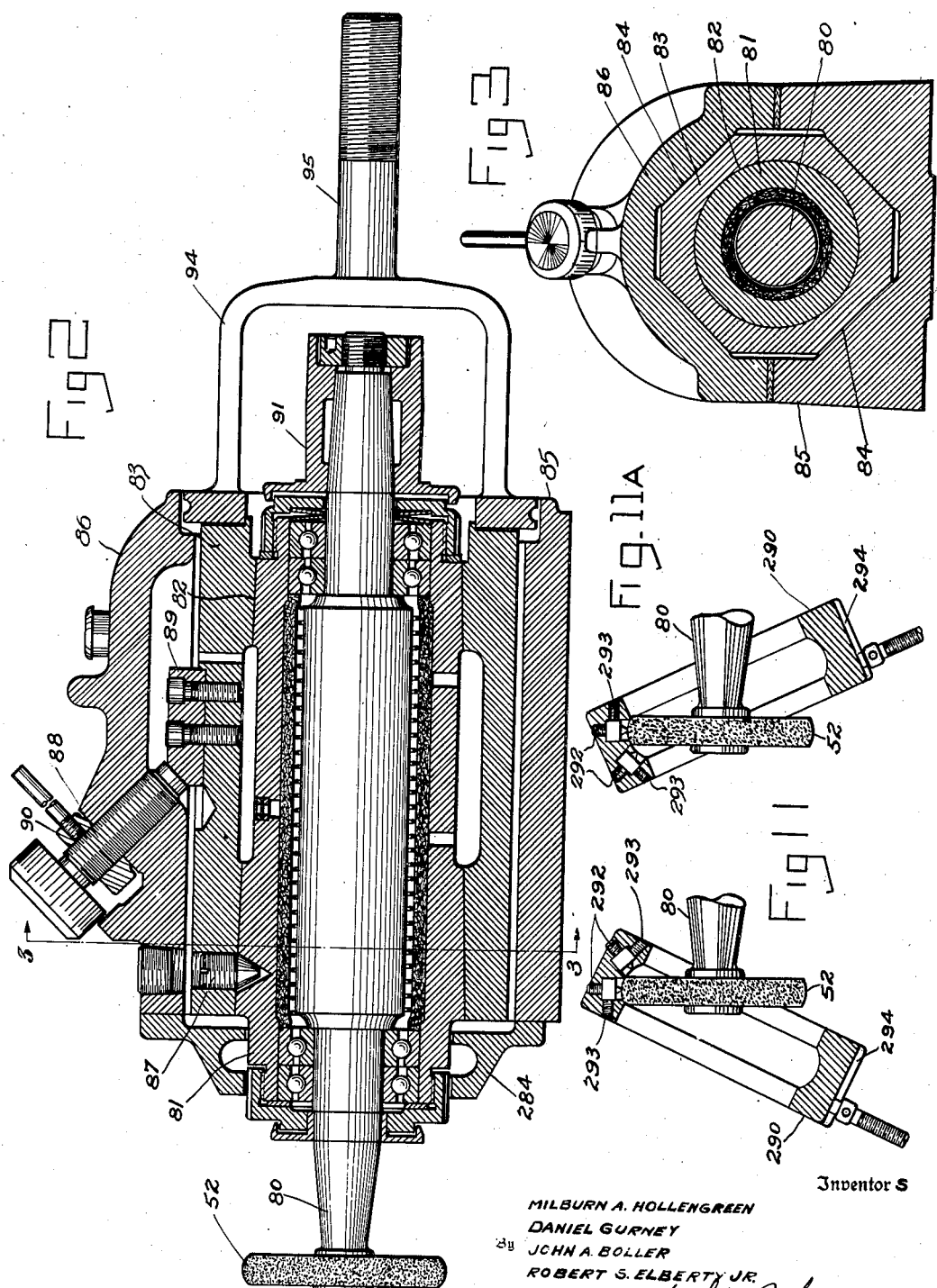

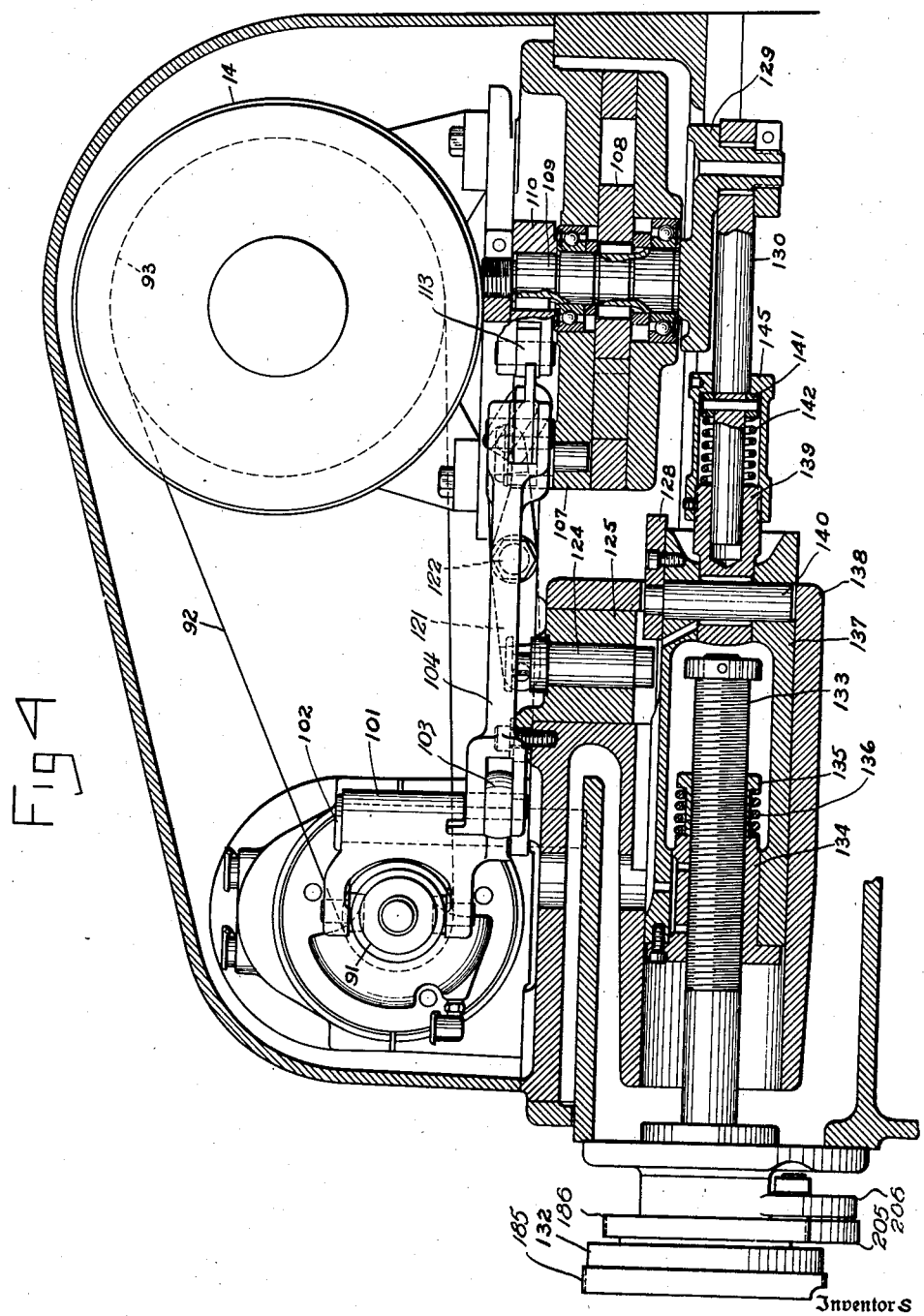

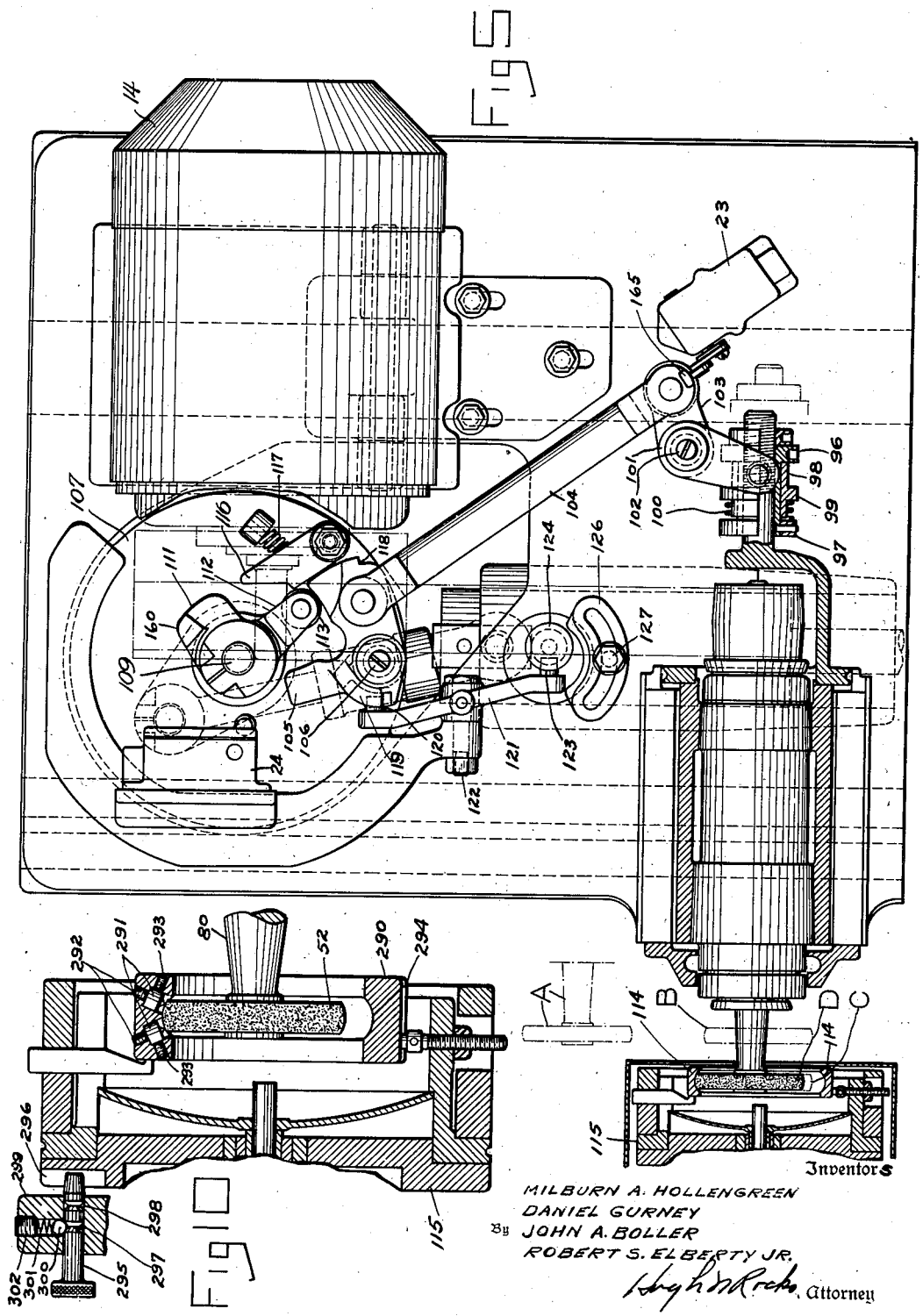

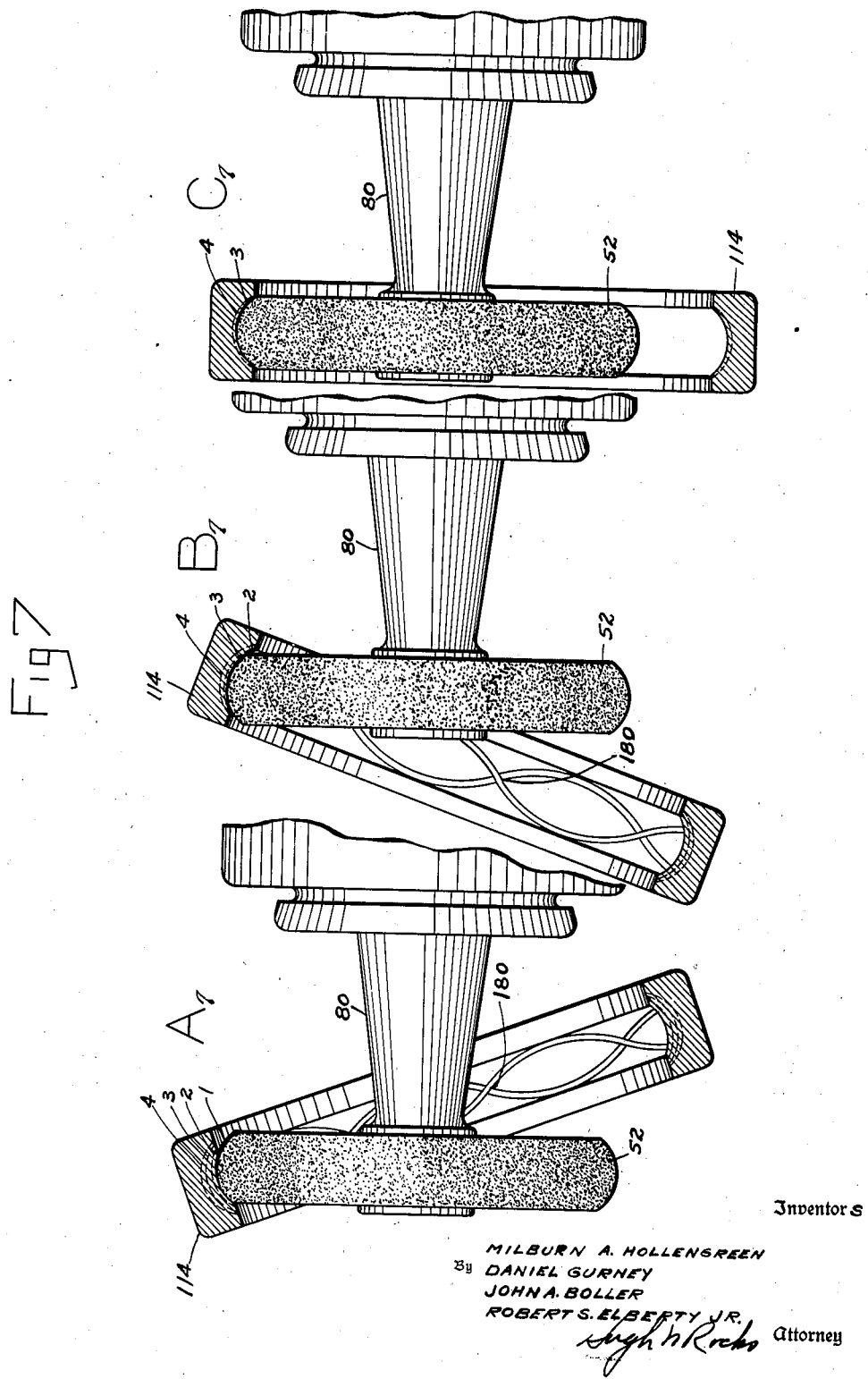

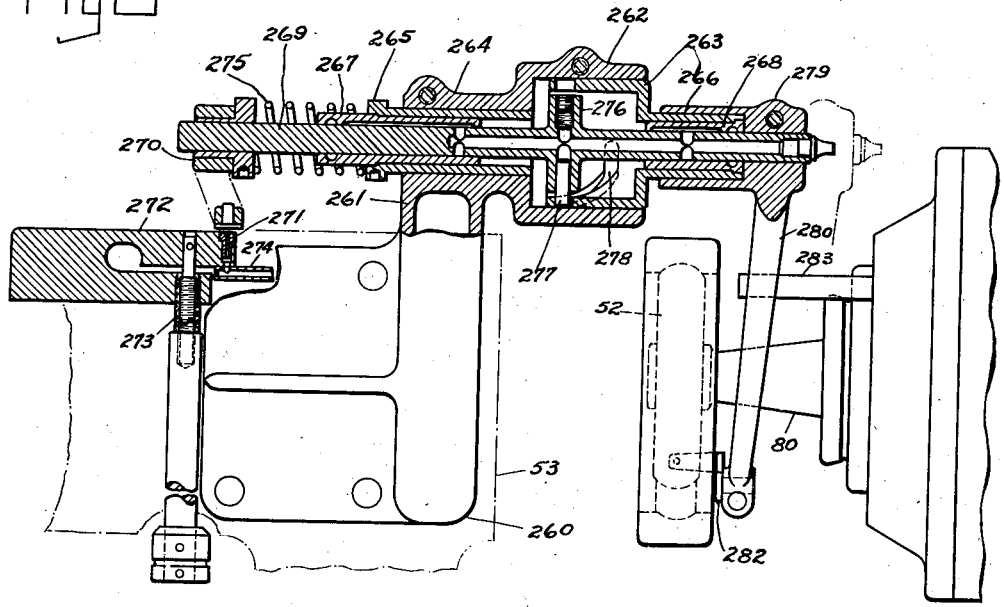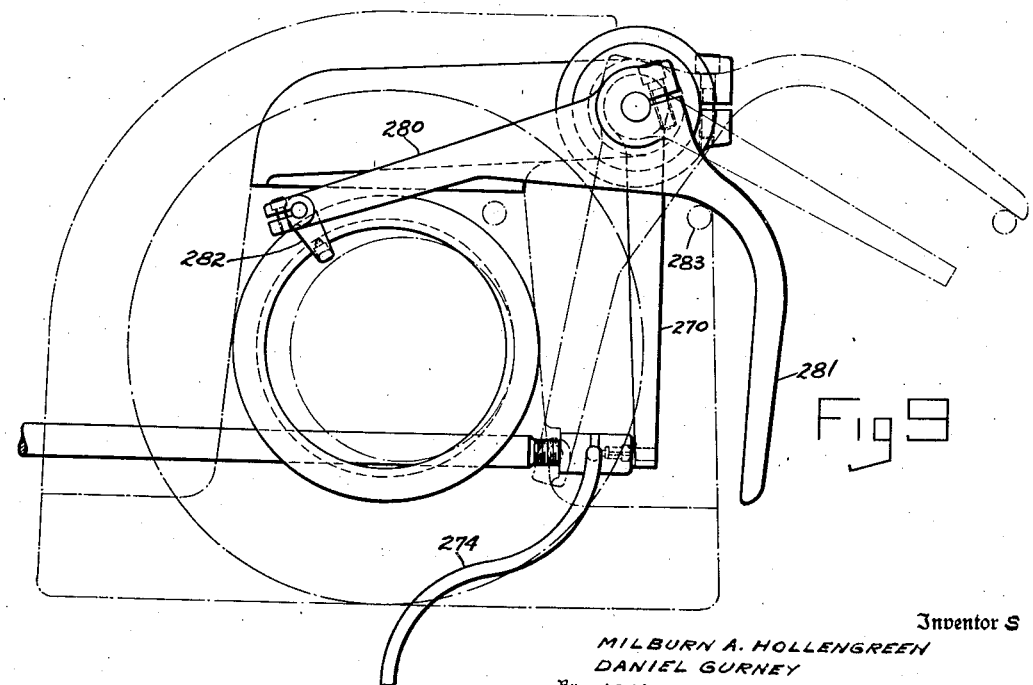

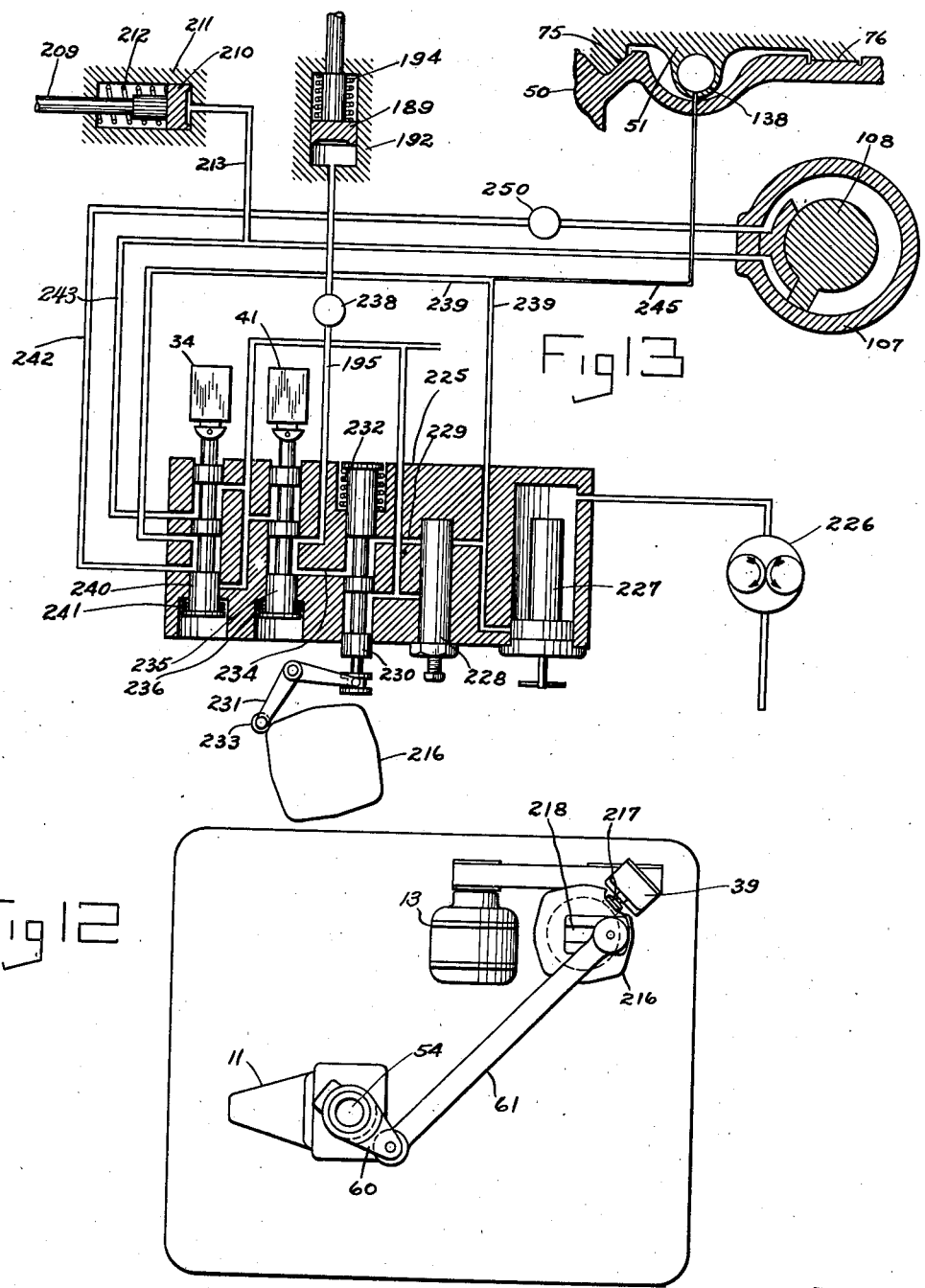

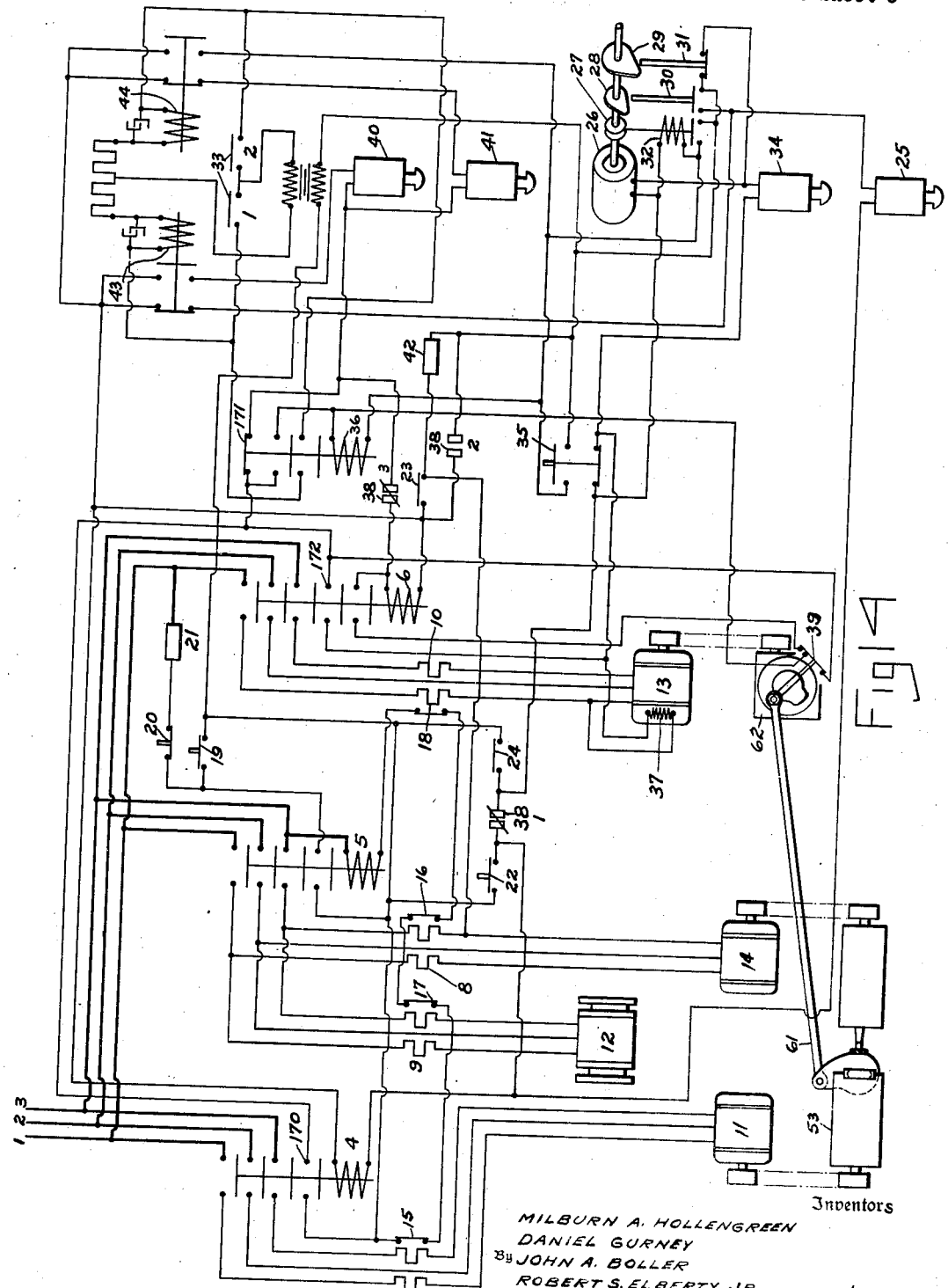

Patented July 8, 1941

2,248,172

UNITED STATES PATENT OFFICE 2,248,172

RACE GRINDER

Milburn A. Hollengreen, Daniel Gurney, John A. Boller, and Robert S. Elberty, Jr., Waynesboro, Pa., assignors to Landis Tool Company, Waynesboro, Pa.

Application June 17, 1938, Serial No. 214,358

13 Claims. (Cl. 51—97)

Our invention relates to machines for grinding bearing races and it is an object of same to provide means whereby a race may be ground to size automatically without attention from the operator other than to load and unload the work and to start the machine by pressing the start button.

A further object is to provide a method of grinding races wherein the final part of the grinding operation occurs without oscillation of the work and with the wheel feed stopped.

A further object is to provide a novel mechanism for shifting the grinding wheel from a remote inoperative position into operative relation with a work piece.

A further object is to provide a work drive motor which will be oscillated with the work.

A further object is to provide a wheel spindle mounting which will be capable of axial movement on the wheel support.

A further object is to provide a sizing device which will move automatically into and out of operative relation with the work in timed relation with the other movements of the machine.

Figure 1 is a front elevation of a race grinder.

Figure 2 is a front elevation of the wheel spindle mounting in section.

Figure 3 is a sectional end elevation of the spindle mounting.

Figure 4 is a right hand end view in section of the wheel positioning mechanism.

Figure 5 is a plan view of the wheel support and the positioning mechanism.

Figure 6 is a front elevation partly in section of the feed mechanism.

Figure 7 illustrates the method of grinding described above.

Figure 8 is a plan view of the sizing device mechanism.

Figure 9 is an end elevation of said sizing device.

Figures 10 and 11 and 11A show the device for dressing the grinding wheel.

Figure 12 is a plan view showing diagrammatically the relative positions of the oscillating column and the drive mechanism therefor.

Figure 13 is a digrammatic sketch of the hydraulic system.

Figure 14 is a wiring diagram.

The usual method of grinding ball race grooves consists in chucking the race in a headstock which is oscillated about an axis which passes thru the center of curvature of the race groove and at the same time subjecting the groove to the action of a grinding wheel. It has been discovered that the surface thus produced consists of very fine criss-cross grinding lines and this condition results in a noisy bearing. Such a surface condition can be corrected by lapping which is very expensive and often results in changing the race curvature produced by the grinding operation.

Another method of correcting the imperfections in a ground race consists in chucking the race in a second machine using a wheel having a face dressed to the proper shape and subjecting the work to a finish grinding operation without the oscillating movement. In order to maintain the necessary curvature of the face of the wheel, the wheel must be dressed frequently and this of course results in high wheel costs on small wheels.

At the beginning of the rough grinding operation the wheel and work have approximately the same curvature and during the rough grinding operation the oscillation of the work determines to a great extent the shape of the work. Because the wheel breaks down rapidly during this operation it also determines the shape of the wheel. As a result of this interaction between the work and wheel, both surfaces have substantially the same curvature at the end of the rough grinding operation. By stopping the oscillation either at this point or after the finish grinding operation while continuing the grinding operation, the objectionable zig-zag marks can be removed and the work ground to size while the radii of the work and wheel remain the same.

Using this method the extra handling of the work in transferring it to a machine for form grinding is eliminated. The form of the face is generated while the wheel is doing useful work whereas time and wheel surface are lost when the face must be formed by a separate dressing operation. The oscillating movement serves to generate the desired form on both the wheel and the work during the rough grinding operation. The rough work serves as a dressing tool and the curved path of the work surface provides the form to which the wheel is dressed.

In Figure 1 numeral 50 indicates the bed of a grinding machine, 51 a wheel support, 52 a grinding wheel mounted thereon and 53 an oscillatable work support or headstock. Said work support is mounted on a vertical oscillating column 54 which in turn is suspended on anti-friction bearings in a sleeve 55 supported in bed 50. At the lower end of said oscillating column a removable bracket 56 is secured and a work drive motor 11 is supported from said bracket. Said motor is preferably mounted on said column in such relation to the center thereof that the inertia due to the oscillating movement will be at a minimum. A pulley 57 on said motor drives thru belt 58 to pulley 59 on the headstock 53. Said motor and pulley are located inside the bed and the belt 58 passes thru an arcuate slot in the top of the bed to reach pulley 59. One of the side walls of pulleys 57 and 59 is threaded on the hub and may be adjusted thereon for varying the pitch of the pulley and thus varying the work speed.

A second bracket 60 is adjustably secured to said column 54 and includes a yoke-like arm which receives one end of a connecting rod 61 from the oscillating mechanism. The other end of said rod is adjustably connected to the driving element of the oscillating mechanism which will be described later. Said driving element and said column are located in diagonally opposite corners of the bed so that connecting rod 61 may be of maximum length thus assuring a more accurate oscillation.

The entire lower portion of the front of the bed is accessible thru doors 70 which are supported on partially concealed hinges at the sides of the bed. Inside the upper edge of said doors is a trough 71 which serves to collect any oil or water which may run down the upper portion of the bed. This trough follows the shape of the door which is curved back toward the bed at the hinged end. A hole 72 is drilled thru the trough at this point to permit the oil or water to escape outside the bed and thus keep it away from the mechanisms inside.

*Wheel positioning and feed mechanism*

Wheel support 51 is slidably mounted for movement transversely on the bed on guides 75 and 76. Grinding wheel 52 is mounted on a spindle 80, Figures 2, 3, 4 and 5, which is rotatably supported on anti-friction bearings in a tapered sleeve 81. Said sleeve in turn is inserted in a correspondingly tapered bore 82 in a ram 83. Said ram is octagonal in cross section, alternate sides thereof forming bearing surfaces 84 which bear on corresponding surfaces in a housing at the front end of wheel support 51 which consists of a base portion 85 and a cap portion 86. A screw 87 having a tapered point is adjustably mounted in ram 83 with said point extending into a tapered notch in sleeve 81. The tapered point engages one side of the notch and serves to hold the tapered surfaces of the sleeve and the ram in close contact. Movement of the ram 83 to the left is adjustably limited by a screw 88 which passes thru cap 86 at an angle and protrudes therefrom into the path of a block 89 secured to the ram 83. The surface on said block which engages said screw is beveled so that when the block and screw come together the lower bearing surfaces of the ram are forced against the corresponding surfaces in the base portion 85 so that the entire assembly is extremely rigid. The head of screw 88 is graduated on its peripheral surface and said screw may be adjusted with reference to a zero point on cap 86. A lock nut 90 serves to secure screw 88 in adjusted position. A pulley 91 on said spindle is driven by a belt 92 which in turn is driven by pulley 93 on motor 14. A guard 94 attached to ram 83 encloses pulley 91 except for a space thru which the belt 92 passes. A stud 95 projects axially from the outer end of said guard and has a flanged bushing 96 threaded thereon. A collar 97 is pinned to said bushing at the end opposite the flange. A sleeve 98 having an annular rib 99 is slidably mounted on said bushing. A spring 100 is mounted on said sleeve between said rib and said collar. A bracket 101 having a yoked portion for inserting between said rib and flange is pivoted on a stud 102 in wheel support 51. An arm 103 on said bracket is pivotally secured to one end of a rod 104. The other end of said rod is pivotally attached to one end of an angle arm 105 which in turn is pivotally mounted on a stud 106 in the housing of motor 107. Said motor includes a rotor 108 keyed to a shaft 109. Movement of said rotor is limited by a dividing block not shown and said block determines the movement of wheel support 51. Said shaft is mounted in anti-friction bearings in the end plates of said motor. At the upper end of said shaft is keyed a hub member 110 having at spaced points on its periphery a lug 111 and a radial arm 112 carrying a roller 113. Said roller rides on the inner surface of angle arm 105 and causes said arm to rock about its pivot. Rocking said arm results in axial movement of wheel 52 into and out of the work 114 which is held in a diaphragm chuck 115 of the type disclosed in Klay et al. Patent 2,026,639 granted January 7, 1936. A lever 150 at the front of the headstock 53 may be operated thru a suitable connection to open and close said chuck as well as to operate a brake to stop rotation of the work. A latch 116 is held against one end of arm 105 by a spring 117. When said arm is moved to its extreme position in a counter-clockwise direction to move the wheel axially out of the work said latch engages a shoulder 118 on said arm and thus prevents accidental movement of the wheel axially toward the work. When the motor rotates in the opposite direction, lug 111 engages and lifts said latch to release said arm 105. At another position on said arm is a positive cam 119 which is operable upon rotation of said arm to shift a pin 120 in one end of a lever 121. Said lever is pivotally mounted on a stud 122 and the other end thereof carries a pin 123 which engages an annular groove at the upper end of a stop 124. Said stop is mounted in an eccentric 125 in wheel support 51. A lip 126 at the upper end of said eccentric has a curved slot thru which a screw 127 is passed to secure said eccentric in any angular position within the limits of the slot and thus adjust the position of said stop relative to a fixed stop 128. The function of said stop is to limit the positioning movement of the wheel after it enters the work.

At the lower end of motor shaft 109 and integral therewith is a crank arm 129. One end of a connecting rod 130 is rotatably attached to said crank.

A hand wheel 132 is mounted on the front of the bed and is attached to a feed screw 133. Said screw rotates in a split nut 134 and 135. The two parts are held apart by a spring 136. Said nut is mounted in a piston-like member 137 which is slidably supported in a cylindrical member 138 suspended from and integral with wheel support 51. At the rear end of member 137 a member 139 is rotatably mounted on a vertical stub shaft 140 in said member 137. Said member 139 has a bore into which a reduced portion of rod 130 may be inserted. A collar 141 is pinned on said reduced portion against the shoulder thereof. A spring 142 is mounted with one end bearing against said collar and the other end against member 139. As the motor turns arm 129, said motor and wheel base move together while the feed screw and associated parts remain in a fixed position. Said spring allows motor to complete its movement after said wheel support has been positioned by stop 124 with wheel in grinding position. A cover 145 consists of a bushing having an inward flange at one end thereof and a threaded portion at the other end whereby said cover may be screwed down so that the inward flange will act as a stop for collar 141 when wheel head is traveling in forward direction.

Wheel-feed and re-set mechanism

This mechanism is shown in detail in Figure 6 and consists of the feed screw shaft 133 at the outer end of which is mounted the hand wheel 132. Mounted also on said shaft adjacent said hand wheel are a ratchet wheel 185 having teeth shaped for receiving impulses in a counter-clockwise direction and a second ratchet wheel 186 having teeth shaped for receiving impulses in a clockwise direction. The grinding feed is effected thru ratchet 185 which is actuated by pawl 187. Said pawl is pivotally mounted at 188 on an extension of piston 189 and has a cam surface 190 in intermittent engagement with a small spring pressed plunger 191 also mounted in the extension of piston 189. Said spring pressed plunger acting against said cam surface urges said pawl into engagement with ratchet 185. Said piston is slidably mounted in a cylinder 192 integral with a base member 193. A spring 194 urges said piston downwardly against the action of fluid under pressure which is introduced to said cylinder thru line 195. The stroke of said pawl may be adjusted by screw 196 in a protruding portion of a cap member 197 on the extension of piston 189. Said screw abuts against a portion of the bed 50 on its downward stroke. A second screw 198 in another protruding portion of cap 197 determines the magnitude of the feeding impulses after the rough grinding operation has been completed. During the rough grinding operation said screw does not come into contact with a stop member. At the end of the rough grinding operation the vertical end 199' of a bent lever 199 is automatically rotated into the path of screw 198 and thereafter the limit of the downward movement of piston 189 is determined by the adjustment of said screw 198. Said lever is pivoted at 200 and the horizontal end of said lever is supported in a link 201 attached to the armature of a solenoid 40. The dot and dash lines indicate the inoperative position of said lever.

Ratchet 186 is actuated by a pawl 205 pivotally supported on an arm 206 which is rotatably mounted on screw shaft 133. Said pawl is held in contact with said ratchet by a spring 214 on said arm 206. The extreme positions of said pawl are indicated by the dot and dash lines. The magnitude of the working stroke of said pawl is determined by the setting of an adjustable stop 207. A link 208 connects arm 206 with piston rod 209 on piston 210. Said piston is slidably mounted for horizontal movement in a cylinder 211. Said piston is moved in one direction by a spring 212 and in the opposite direction by fluid under pressure from line 213.

Method of forming races

Our method of forming bearing races is depicted in Figure 7 in which sketches A7, B7 and C7 show successive stages of the grinding operation. In sketch A7, numeral 1 indicates the location of the surface of the groove in an unground race, 2 indicates the position of the groove at the end of the rough grinding operation, 3 the position of the groove at the end of the semi-finish grinding operation and 4 the position of the groove after the form grinding operation. During the rough and semi-finish grinding operations the work is oscillated and due to this movement the ground surface consists of innumerable fine criss-cross lines 180. It has been found that the presence of these lines is responsible for a certain amount of noise in an assembled race. In order to correct this condition the oscillating movement of the work is stopped either after the semi-finish grinding, or if it is desired to eliminate the semi-finishing operation, after the rough grinding. During the final grinding the feed may be stopped altogether or reduced to a very small amount depending upon the amount of stock to be removed during this operation. Without the oscillating movement the shape of the groove gradually conforms to the space of the wheel and the criss-cross lines are removed and replaced by parallel lines.

Sizing device

A sizing device is shown in Figures 8 and 9 and consists of a bracket 260 mounted on top of headstock 53 and having a rearwardly extending portion 261. Said portion is substantially cylindrical in shape and is bored to two diameters. In the larger diameter 262 is inserted a cylindrical member 263 also having two diameters. In the small diameter 264 of portion 261 is a flanged sleeve 265 having an inside diameter of substantially the same diameter as the small portion 266 of member 263. In both the sleeve 265 and the small portion 266 are flanged bushings 267 and 268 respectively. Said bushings support a shaft 269 which is movable angularly and linearly therein. At the left end of said shaft is attached an arm 270 which extends downwardly when in operative position so that the lower end thereof is in close proximity to a nozzle 271. Said nozzle is mounted in a slotted bar 272 attached to the headstock 53 in any convenient location. A differential adjusting screw 273 is fixed in said bar on the same side of the slot as nozzle 271 and is threaded in that portion of the bar at the other side of the slot. By turning said screw a fine adjustment of nozzle 271 toward and from arm 270 may be obtained. A supply of air or other suitable fluid is supplied to said nozzle from a pump, not shown, thru a line 274 which passes thru oscillating column 54. A spiral spring 275 encircles said shaft between said flanged sleeve 265 to which it is secured and said arm 270 to which it is secured also. Thus said spring urges said shaft to axial as well as angular movement. A portion 276 of said shaft passing thru the larger diameter of member 263 is of greater diameter than the rest of said shaft and is bored to receive a pin 277 which fits in a cam groove 278 in the inside of the large diameter of member 263. At the right hand end of shaft 269 is secured a hub-like member 279, part of which is bored large enough to fit over portion 266 of member 263. Integral with said hub-like member are two angularly spaced arms 280 and 281. A feeler 282 is removably secured to the end of arm 280. Arm 281 curves back and down behind a pin 283 in an end cap 284 attached to the base and cap members 85 and 86 respectively of the wheel spindle mounting. The dot and dash lines show the inoperative positions of the various parts of the sizing device as well as a general outline of the headstock 53.

The method and means for controlling the grinding operation by the above described sizing device is similar to that shown in Patents 2,064,427 granted December 15, 1936; 2,088,682 granted August 3, 1937; and 2,105,841 granted January 18, 1938.

Wheel dressing device

The means for dressing the wheel is shown in Figs. 10, 11 and 11A and consists of a false work piece or dummy race 290 having a pair of dressing diamonds 291 inserted therein. The points of said diamonds lie on a curve which when the headstock is oscillated defines the shape of the finished groove in the work piece. Screws 292 serve to adjust the position of said diamonds when necessary while screws 293 lock said diamonds in adjusted position. Said dummy race may be held in chuck, 115 the same as a conventional work piece and may be located with the diamonds in a horizontal plane by providing a shoulder or slot on the periphery thereof which may be engaged by one of the gripping members of chuck 115. The chuck should be held against rotation during dressing and to this end is provided a pin 295 slidably supported on headstock 53 for movement axially of the chuck and adapted to be inserted in a slot 296 in said chuck. A pair of axially spaced grooves 297 and 298 on said pin determines the operative and inoperative positions thereof. A lug 299 on the headstock supports pin 295. A hole is drilled in said lug to receive a ball 300 for engaging grooves 297 and 298, a spring 301 and a screw 302 for holding said spring and ball in place and for varying the pressure thereon.

Oscillating mechanism

In Figure 12 is shown a plan view of the oscillating mechanism. The purpose of this view is to show that the driving and driven members of the oscillating mechanism are spaced apart as far as the walls of the bed will permit. This arrangement insures a more uniform oscillating movement of the work since the path of rod 61 remains more nearly tangent to the path of the arm of bracket 60.

The driving mechanism consists of a speed reducer 62 driven by a motor 13. A disk cam 216 is rotatably mounted at the top of said speed reducer and is driven thereby. The four lobes of said cam serve to actuate the valve in control of the grinding feed. Under said four lobe cam is a single lobe cam 217 which actuates tappet switch 39. On top of said four lobe cam and integral therewith is a radial T slot 218. A T bolt in said slot is secured to one end of rod 61. The range of oscillation may be varied by varying the position of said T bolt in said slot.

Hydraulic system

The hydraulic system shown diagrammatically in Figure 13 consists of the motor 107 for effecting the positioning of the grinding wheel, piston 189 in cylinder 192 for causing the grinding feed and piston 210 in cylinder 211 for resetting the grinding feed. The supply of fluid under pressure to said mechanism is controlled by a valve mechanism 225. Fluid under pressure is supplied by pump 226 to a filter 227 then to a relief valve 228 both of which form a part of the mechanism 225.

From valve 228 fluid passes thru passage 229 to valve 230. Said valve is reciprocated by cam 216 thru lever 231. A spring 232 urges said valve in a direction to stop the flow of fluid under pressure therethru and hold roller 233 on lever 231 in contact with cam 216. In response to action of said cam, valve 230 directs fluid under pressure intermittently thru passage 234 to valve 235 which is held in open position by solenoid 41 against the action of spring 236. From valve 235 said fluid passes thru line 195 and throttle valve 238 to cylinder 192. A second passage 239 leads direct from said filter to a valve 240 which is shifted in one direction by a solenoid 34 and in the opposite direction by a spring 241. When shifted by said solenoid, said valve directs fluid thru line 242 to one side of wheel positioning motor 107 to move the wheel support 51 and grinding wheel 52 into operative position. A throttle valve 250 in line 242 permits the operator to control the rate of movement of said motor and hence of said grinding wheel. When solenoid 34 is deenergized and said valve is shifted in the opposite direction by spring 241 fluid is directed thru line 243 to the opposite side of said motor 107 to move the wheel to inoperative position and at the same time thru a branch line 213 of line 243 to cylinder 211 to reset the grinding feed. A restricted passage 245 consisting of a piece of tubing having a very small bore may be connected into the hydraulic system at any point where pressure is available, in this case line 239, to direct a small volume of oil from the system to the inside surface of member 138 to lubricate same.

Coolant supply mechanism

The supply of coolant to the work is controlled by a valve 255, operated by solenoid 25, from which valve coolant passes thru a flexible tube to line 256 inside the oscillating column. From where said line emerges at the lower portion of headstock 53, said coolant may be directed to the work either thru a line 257 leading thru the headstock spindle or it may be directed on the work from the front.

Operation

To start the machine from rest, the operator presses push button switch 19 and closes a circuit thru overload relays 15, 16, 17 and 18 and relay 5 which starts pump motor 12 and wheel motor 14. Relay 5 is held closed by a conventional holding circuit after the push button 19 has been released.

After chucking a work piece the operator starts the grinding cycle by pressing push button 22 which energizes solenoid 34 to start wheel positioning motor 107 in a counter-clockwise direction. During the first part of the movement an auxiliary lug 160 on lug 111 releases normally closed switch 24 which holds the circuit closed after push button 22 has been released. Crank 129 rotates thru an angle sufficient to move motor 107 and wheel support 51 forward until the wheel 52 moves from position A to position B. During this movement the roller 113 rides on the arm 105 without affecting it until it reaches the relief portion at the intersection of the two parts of the arm. At this point the wheel has reached position B, crank 129 has reached the end of its stroke and is passing across center. As wheel support 51 moves forward pin 283 permits spring 275 to rotate shaft 269 in a clockwise direction so that feeler 282 moves axially and radially into contact with the surface to be ground at a controlled rate which is determined by the speed of support 51. At the same time arm 270 moves into operative position relative to air nozzle 271.

As crank 129 passes across center, roller 113 engages the right hand portion of arm 105 and causes rotation of said arm in a clockwise direction. This movement is transferred thru rod 104 and bracket 101 to move wheel 52 from position B to position C. During the movement of arm 105, cam 119 acts to lift the rear end of lever 121 and drop the front end thus causing stop 124 to drop into operative position to engage stop block 128. During the movement of the wheel from position B to position C a lug 165 on rod 104 actuates limit switch 23 to complete a circuit thru relay 4 and start work drive motor 11. This occurs just as the wheel enters the race. The line to switch 23 comes from one of the lines to wheel motor 14. When relay 4 is closed a circuit is completed thru contact 170 thereof, the normally closed contact 171 of relay 36, and contact 2 of selector switch 38 to the coil of relay 6. A circuit thru contact 172 of said relay energizes brake coil 37 and releases the brake on oscillating motor 13. Said motor is started in response to the closing of said relay 6. Said roller continues to move along arm 105 without causing further rotation of same but just before this idle movement is completed crank 129 has passed across center and begins its stroke in the opposite direction. During this last movement arm 112 is substantially parallel with rod 104 and serves to lock the mechanism in this position and thus prevent axial movement of the wheel. This final movement of the crank causes a reverse movement of the wheel from position C to position D in which position the wheel is ready to start grinding. The amount of travel from position C to position D is variable and is determined by the position of stop 124.

The current which energizes relay 4 also passes thru the normally closed contacts of the second sizing device relay 44 to energize solenoid 41 which shifts feed valve 235 to start the feeding movement. The same current passes thru the normally closed contact of the first sizing device relay 43 to energize valve solenoid 25 and start a flow of coolant on the work. The means for energizing relays 43 and 44 is similar to that described in the above mentioned patents, viz., 2,064,427, 2,088,682 and 2,105,841; and consists of spaced contacts in one leg of a manometer tube. Variation in flow of air from nozzle 271 results in a corresponding variation in pressure in the manometer tube. Mercury is shifted in said tube to successively submerge the spaced contacts 33 and complete circuits between said contacts and a third or common contact.

When solenoid 41 is energized valve 235 is shifted to direct fluid from valve 230 which is opened and closed intermittently by cam 216 on speed reducer 62. Said valve 235 directs fluid under pressure to cylinder 192 to effect a reciprocating movement of piston 189 and thus pawl 187 to rotate ratchet 185. The length of the stroke during the rough grinding operation is determined by the adjustment of screw 196. At the end of the roughing operation the sizing device energizes relay 43 which directs current thru the normally open contact of said relay to solenoid 40. Said solenoid then rotates bent lever 199 and places a stop portion 199' thereof in the path of screw 198. The return movement of the pawl 187 is limited and the rate of feed reduced. At the same time normally closed circuit of said relay 43 is opened and solenoid 25 deenergized thus shutting off the flow of coolant.

When the second contact of switch 33 is closed at the end of the semi-finish grinding operation relay 44 is energized and its normally closed contact opened thus deenergizing feed valve solenoid 41. Spring 236 shifts said valve to off position and movement of pawl 187 is stopped. Closing the normally open contact of relay 44 energizes coil 32 of timer clutch 27 and starts the operation of the timing mechanism. Said normally open contact of relay 44 also directs current to the coil of relay 36 thru tappet switch 39 when said switch first closes after the operation of relay 44. The normally closed contact 171 of relay 36 is opened when said relay 44 is energized but the coil of relay 6 remains energized thru its holding circuit which includes tappet switch 39. When said tappet is opened again, the holding circuit is opened and the coil deenergized, thus permitting opening of the relay 6. The circuit thru contact 172 of said relay 6 deenergizes the brake coil 37 so that the brake becomes effective the instant the flow of current is cut off to oscillating motor 13 thru relay 6. This method of braking avoids the momentary energizing of the brake coil by the motor when said coil is connected directly into the motor circuit. The sizing device does not stop the oscillating motor directly for the reason that if the sizing device functioned after the tappet switch was opened the stopping would occur at a different point than if it functioned at the same instant the switch opened. With this arrangement the braking begins always just as the switch is opened and the oscillating spindle will stop within four or five degrees of the same place every time.

At this time the feed, coolant and oscillation have been stopped but the timing mechanism is in operation. After a predetermined period during which the final forming of the race occurs, contact 31 of timing relay is opened, closely followed by the closing of contact 30. Opening contact 31 deenergizes solenoid 34 and permits spring 241 to return valve 240 to reverse position and thus cause a reverse movement of motor 107. Valve 240 in this position also directs fluid to feed re-set cylinder 211 to shift piston 210 and pawl 205 and rotate ratchet 186 and feed screw 133 in the opposite direction an amount equal to the forward feed during the grinding operation. Closing contact 30 energizes solenoid 25 and causes coolant to again flow on the work to cool same after the dry grinding during the finish and spark-out periods. The control of the coolant is not limited to the particular sequence described here. Obviously only a slight change would be necessary to cause the coolant to be started and stopped at different times in the grinding cycle.

The first part of the reverse movement of motor 107 causes wheel 52 to move from position D to position C, then as crank 129 passes across center, roller 113 engages the left portion of arm 105 and rotates said arm in a counter-clockwise direction thus causing the wheel 52 to move from position C to position B and also opening switch 23. Opening switch 23 breaks the circuit to the coil of relay 4. Deenergizing said relay opens the circuit to work drive motor 11. Opening switch 23 also breaks the circuit to the coil of relay 6 to stop the oscillator drive motor and thru opening contact 172 of said relay to deenergize brake coil 37 and permit the motor brake to stop said motor.

As the wheelbase recedes further, auxiliary lug 160 opens switch 24 to deenergize the timer clutch solenoid 32 and stop timer motor 26 thus permitting same to reset. Opening switch 24 also deenergizes the coolant valve solenoid 25 stopping the flow of coolant.

Continued movement of motor 107 finally causes wheel 52 to move from position B to position A, after which the operator may shift handle 150 to apply a brake to the work and release the finished piece from the chuck.

A selector switch 38 enables an operator to select in addition to the normal grinding cycle, a chuck grinding setup or a headstock jogging setup each of which may be initiated from the cycle start button 22. The various positions of switch 38 are indicated as $38_1$, $38_2$ and $38_3$. During grinding as shown in Figure 14, circuits are closed at $38_1$ and $38_3$. During chuck grinding it is necessary to eliminate operation of the oscillating mechanism. For this purpose $38_3$ and $38_2$ are opened and $38_1$ is closed. Opening $38_3$ prevents energizing of relay 6 of the oscillating motor control when the wheel moves axially into the work. All the other movements are performed the same as during the normal grinding cycle. When it is desired only to jog the work motor 11 the selector switch is opened at $38_1$ and $38_3$ and closed at $38_2$. The circuit to motor 11 usually passes thru switch 23 but since there is no movement of the wheel actuating mechanism at this time, the circuit must return thru $38_2$ and fuse 42 to the extension of L3 in the wheel motor circuit. The machine may be stopped and the parts returned to inoperative position by pushing cycle return switch 35. Said switch has a normally open contact and a normally closed contact. Closing the normally open contact energizes coil of relay 36 thru tappet switch 39 and holds said coil energized thru a normally open contact of the said relay. A normally closed contact 171 of said relay is opened to deenergize solenoid 40 and stop the grinding feed and to open the circuit to the coil of oscillator relay 6. The holding circuit for relay 6 holds the coil energized thru tappet switch 39. The next time the tappet switch opens said coil for relay 6 will be deenergized thru the holding circuit and since the circuit thru contact 171 of relay 36 is also open the oscillating motor is stopped; opening the normally closed contact of switch 35 sets the brake 37 on oscillating motor 13 and deenergizes the rapid feed solenoid 34. Returning the wheel base to inoperative position as described above results in stopping the work drive motor 11 resetting the timing mechanism.

We claim:

1. A grinding machine having a spindle support, a housing on said support, guide ways in said housing, a ram having guide surfaces corresponding to those in said housing and adapted to co-act therewith, a spindle rotatably supported in said ram, means for effecting axial movement of said ram in said housing and means for stopping said axial movement which is effective also to urge said co-acting guideways and guide surfaces into locking engagement with each other.

2. A grinding machine having a work support, means for rotatably supporting a work piece thereon, a wheel support and means for positioning same transversely relative to said work support for effecting a grinding operation, a sizing device having a feeler for engaging the surface to be ground, means for urging said feeler into contact with a work piece, means responsive to said transverse positioning movement upon retraction thereof for withdrawing said sizing device radially, and means including a cam and follower responsive to said radial movement for effecting an axial movement thereof.

3. A grinding machine having a work support and means for supporting a work piece thereon, means for rotating said work piece, means for oscillating said work piece, a wheel support, a grinding wheel rotatably mounted thereon and means for positioning said grinding wheel in operative relation with said work piece, means for dressing said grinding wheel including a false work piece having a plurality of dressing diamonds mounted therein, means for effecting said oscillating movement during a dressing operation and means for holding said false work piece against rotation with the diamond points in substantially the same horizontal plane as the axis of the grinding wheel whereby said diamond holder may be substituted for said work piece and thereby effect a dressing of the grinding wheel.

4. A grinding machine having a work support and means for supporting a work piece thereon, means for effecting an oscillating movement of said work support, a wheel support, a grinding wheel rotatably mounted thereon and means for positioning said grinding wheel in operative relation with said work piece, means for dressing said grinding wheel including a false bearing race having a plurality of dressing diamonds mounted therein, means for initiating said oscillating movement after the completion of said positioning movement whereby said diamond holder may be substituted for said work piece and thereby effect a dressing of the grinding wheel and locking means for positively holding said race against rotation during dressing.

5. A grinding machine having a work support and a grinding wheel support, mechanism for moving said grinding wheel transversely of said work support with said wheel spaced therefrom until said wheel and said support are substantially in axial alignment, mechanism for effecting axial movement of said wheel to a point inside the work piece in alignment with the surface to be ground, said transverse moving means being operable at this point to reverse said first movement and cause said grinding wheel to engage said work piece.

6. A grinding machine having a work support and a grinding wheel support, a grinding wheel rotatably mounted on said grinding wheel support, mechanism for moving said grinding wheel transversely of said work support with said wheel spaced therefrom until said wheel and said support are substantially in axial alignment, mechanism for effecting axial movement of said wheel to a point inside said work piece in alignment with the surface to be ground, said transverse moving means being operable at this point to reverse said first movement and cause said grinding wheel to engage said work piece, a stop mechanism for limiting said transverse movement with the wheel inside the work, and mechanism for rendering said stop mechanism inoperative with the wheel outside the work.

7. A grinding machine having a work support and a grinding wheel support, mechanism for moving said grinding wheel transversely of said work support with said wheel spaced therefrom until said wheel and said support are substantially in axial alignment, mechanism for effecting axial movement of said wheel to a point inside said work piece in alignment with the surface to be ground, said transverse moving means being operable at this point to reverse said first movement and cause said grinding wheel to engage said work piece, a stop mechanism for limiting said transverse movement with the wheel inside the work, and mechanism responsive to said axially moving mechanism for rendering said stop mechanism operative or inoperative.

8. A grinding machine having a work support and a grinding wheel support, mechanism for moving said grinding wheel transversely of said work support with said wheel spaced therefrom until said wheel and said support are substantially in axial alignment, mechanism operable by said transverse moving mechanism for thereafter effecting axial movement of said wheel to a point inside the work piece in alignment with the surface to be ground, said transverse moving means being operable at this point to cause said grinding wheel to engage said work piece.

9. A grinding machine having a wheel support, a work support, mechanism for effecting relative transverse movement between said supports, a housing on said wheel support, guide ways in said housing, a ram having guide ways corresponding to those in said housing and adapted to co-act therewith, a wheel spindle rotatably supported in said ram, and means actuated by said transverse moving mechanism for effecting axial movement of said ram in said housing.

10. In a metal working machine, mechanism for stopping a moving part thereof in a predetermined position including a motor for driving said part, a brake, a cam movable with said part, a tappet switch adapted to be operated by said cam, means to prevent initiating operation of said stopping means while said tappet switch is held in open position including a pair of relays one of which has contacts for controlling the other, a size control mechanism operable only when said tappet switch is closed for actuating one of said relays to deenergize the other, and a holding circuit in said second relay for preventing deenergization thereof until said tappet is opened.

11. A grinding machine comprising a wheel support, a grinding wheel rotatably mounted thereon, a work support, means for effecting an oscillating movement of said work support, means for providing a relative feeding movement between said supports, a size control mechanism including means operable in response to a predetermined change in size of a work piece for stopping said oscillating movement while continuing the grinding operation with the wheel in contact with the same portion of the work, and means operable after a predetermined interval for separating the wheel from the work.

12. A grinding machine comprising a wheel support, a grinding wheel rotatably mounted thereon, a work support, means for effecting relative oscilalting movement between said supports, means for prividing a relative feeding movement between said supports, a size control mechanism including means operable in response to a predetermined change in size of a work piece for stopping said oscillation movement while continuing the grinding operation with the grinding wheel in the same axial position, and means operable at a further predetermined size of the work for separating the work and wheel.

13. A grinding machine having a work support and a grinding wheel support, a grinding wheel rotatably mounted on said grinding wheel support, mechanism for moving said grinding wheel transversely of said work support with said wheel spaced therefrom until said wheel and said support are substantially in axial alignment, mechanism for effecting axial movement of said wheel to a point inside said work piece in alignment with the surface to be ground, said tranverse moving means being operable at this point to cause said grinding wheel to engage said work piece, and a stop mechanism for limiting said transverse movement with the wheel inside the work.

MILBURN A. HOLLENGREEN.
DANIEL GURNEY.
JOHN A. BOLLER.
ROBERT S. ELBERTY, Jr.